United States Patent Office 3,220,946
Patented Nov. 30, 1965

3,220,946
BENEFICIATED CLAY COMPOSITION FOR USE IN DRILLING FLUIDS
Finis Turner, Houston, Tex., assignor to Magnet Cove Barium Corporation, Houston, Tex.
No Drawing. Filed Aug. 8, 1960, Ser. No. 50,048
18 Claims. (Cl. 252—8.5)

This invention relates to methods for treating bentonite clays to increase their yields. In one aspect, it relates to beneficiated bentonite clay compositions particularly useful in the preparation and maintenance of well fluids, and in another aspect it relates to improved well fluids.

The yield of clay is defined as the number of 42 gallon barrels of aqueous dispersion, or mud, having a viscosity of 15 centipoises which can be prepared from a ton of clay. Thus, the yield of a clay is quality index insofar as its use in the preparation of mud is concerned, and it is obvious that the number of barrels of mud of desired viscosity which can be prepared from a ton of clay determines the commercial value of a clay for well fluid purposes. For certain special purposes such as shot-hole drilling in which muds have very high viscosities and low weight per gallon, it is highly important that the high viscosity be obtained by the use of small amounts of clay.

The most valuable clays used in making well fluids are sodium bentonites such as Wyoming bentonite. These clays ordinarily will yield from 90 to 115 barrels per ton of 15 centipoise mud merely by dispersing the clay in water and then letting it stand until hydration is substantially complete.

Many attempts have been made to increase the yield of Wyoming bentonites and other sodium bentonites by treating them with various chemicals. An increase in yield has been obtained in some cases, but there are two principal economic factors involved which make it very difficult to beneficiate these high quality clays profitably. First, the chemicals used for beneficiation must be quite cheap; and second, the beneficiation must be obtained by the addition of small quantities of chemical materials to the clay, because the use of more than 5 percent of additives will change the freight rate applicable to the clay from a low freight rate to a much higher rate, which is applicable to chemical products. As a result, if more than 5 percent of chemical ingredients are combined with the clay to obtain higher yield, it is quite possible that the cost of the resulting clay delivered at a well head will be greater per barrel of mud than will an untreated bentonite. This increase in cost will be due to increased freight charges resulting from the increased rate.

The sodium bentonites usually are added to well fluids because of their colloidal, thixotropic and beneficial wall building characteristics. When a mud of a preselected viscosity is desired, a certain percentage of sodium bentonite may be added in order to attain the desired viscosity. It is therefore apparent that the cost of a drilling mud will vary with the yield of sodium bentonite, the cost of chemical additives mixed with the sodium bentonite to beneficiate its mud-forming power, and the freight rate applicable to the clay.

It has been quite difficult to find a yield increasing additive to be used with bentonite to reduce the over-all cost of mud at the well head because of the above factors. A great deal of work has been expended in trying to determine a method for beneficiating bentonites so that small quantities of cheap additives will increase the yield without increasing the freight rate applicable to the finished material.

Accordingly, it is an object of this invention to provide a process for beneficiating a clay of the sodium bentonite class which will increase its yield in which beneficiation of the clay may be obtained by the addition of small amounts of inexpensive materials.

Another object of the invention is to provide a beneficiated clay composition in which certain polymers and salts are cooperative to increase the yield of the clay.

Another object of the invention is to provide a method for beneficiating sodium bentonites in which a joint or synergistic action occurs between certain polymers and salts.

Another object is to provide a method for beneficiating sodium bentonites by the use of small quantities of additives which will not cause increased freight rate to be applicable to the beneficiated bentonite material.

Other objects, advantages and features of this invention will be apparent to one skilled in the art upon a consideration of the specification and the attached claims.

In accordance with this invention, the yield of a sodium bentonite clay is increased by treating the clay with a water soluble polymerized material selected from the group consisting of ethylene, butylene and isobutylene copolymers of maleic anhydride, water soluble polyacrylic acids having a molecular weight in the range from 25,000 to 150,000, and alkali salts thereof, together with a small amount of a salt selected from a group consisting of sodium formate, calcium formate, calcium acetate, sodium thiocyanate, sodium sulfate, magnesium sulfate, calcium sulfate, lithium sulfate, potassium sulfate, salts prepared by treating sodium bentonite clays with from 0.5 to 1.0 percent of sulfuric acid, and mixtures thereof. The total quantity of polymers and salts used in treating the clay is less than 5 percent.

This process is effective only when applied to sodium bentonites, such as Wyoming bentonite, and does not appreciably increase the yield of calcium bentonites or montmorillonites and similar lower grade clays. Many of the salts presently known to thicken hydrated bentonites are not effective if substituted for those recited in the above group. For example, such salts as sodium chloride, sodium carbonate, sodium bicarbonate, calcium carbonate, and calcium chloride are not effective, and most calcium salts have little or no effect.

The thickening effect which is obtained by treating a clay with both polymer and salt, is opposite to that obtained when a clay is treated in dry state with salt alone.

It is well known in the art that intimately mixing salts with dry clay results in a clay suspension in water having lower viscosity than a suspension of the clay alone, in contrast to the thickening effect of the addition of salt after clay has been suspended in water for a period of time sufficient for hydration to become substantially complete. In the latter case, it is well known that salts added to fully hydrated or substantially fully hydrated bentonite suspensions will thicken such suspensions or increase the viscosity of the clay suspension.

In the present invention, however, the salt and polymer are applied to dry clay. When the clay is suspended in water, they cooperate to form a suspension of increased viscosity. The reaction which results in increasing the viscosity of the clay slurry is somewhat obscure but apparently there is a reaction between the salts and the polymers, or at least a synergistic effect of polymer and salt, which results in a great change of the rheological properties of the clay.

The result of this reaction cannot be compared to the effect following the addition of a salt to a fully hydrated bentonite suspension. The reaction is not the same as is quite obvious from consideration of the fact that sodium chloride is one of the most effective thickening agents when added to a suspension of hydrated bentonite, but it is completely ineffective to cooperate with the polymers of the present invention for producing increased viscosity in a suspension formed by adding a mixture of dry salt, polymer and sodium bentonite to water.

The copolymers employed in this invention are selected from the group consisting of ethylene maleic anhydride copolymers, butylene and isobutylene maleic anhydride copolymers and water soluble polyacrylic acids having a molecular weight in the range from 25,000 to 150,000. The molecular weight of the maleic anhydride copolymers is usually expressed in terms of specific viscosity which, for the purpose of this specification and claims, will be defined as determined at 25 degrees centigrade on a one percent solution of the anhydride form of the copolymer in dimethyl formamide. For the ethylene and butylene maleic anhydride copolymers, the lower limit of specific viscosity is defined at about 0.1, and all such specific copolymers having specific viscosity above this value will have beneficial effects upon the clay.

The upper limit of molecular weight does not appear to be critical and may be assumed to be determined by the highest molecular weight of polymer capable of being synthesized. Based upon the presently available molecular weight ratios of ethylene- and butylene-maleic anhydride copolymers, the specific viscosity range of useable materials may be said to be in the range of 0.1 to 4.02. However, while these copolymers having specific viscosities in this range are all beneficiating agents, some are more effective than others. For example, when three pounds of copolymer per ton of clay or less is used, the peak in yield of the bentonite clay seems to occur at a specific viscosity of about 0.4; specific viscosities either higher or lower than this value increase the yield of the clay to a smaller extent. Accordingly, it will ordinarily be preferred to use an ethylene or butylene maleic anhydride copolymer with a specific viscosity of about 0.4. For amounts of these copolymers of about 4 pounds per ton of clay or greater, no yield peak has been detected with change in specific viscosity, the yield increases with specific viscosity. Therefore, where such larger amounts of copolymer are to be used, it will ordinarily be preferred to use one with as high a specific viscosity as can be obtained.

Isobutylene maleic anhydride copolymer is not as efficient as the ethylene maleic anhydride copolymer, and the lower limit of specific viscosity which appreciably beneficiates bentonite occurs at about 0.5. For this material, again the upper limit of specific viscosity or molecular weight is the highest molecular weight obtainable. For this particular copolymer, the yield of clay increases with increasing specific viscosity of copolymer until it reaches a peak at a specific viscosity of about 1.0, after which the yield decreases with increasing specific viscosity. This seems to be true for all concentrations of the copolymer. Accordingly, a specific viscosity of 1.0 is preferred when isobutylene maleic anhydride copolymer is used.

The amount of the copolymer that can be added to the clay will depend upon the extent of beneficiation desired and this is particularly true of the ethylene maleic anhydride copolymer. Very small amounts can be employed and still get appreciable beneficiation. Amounts in the range of 0.1 to 10 pounds per ton of clay can be used, but it is preferred to use from 0.25 to 5.0 pounds per ton of clay. Expressed in another way, the amount within the limits from 0.1 to 10 pounds per ton of clay which will be used, usually will be that which is required to increase the yield of the clay to a desired value such as 200 barrels per ton.

The olefin-maleic anhydride copolymers useful in this invention are readily prepared by techniques well known in the art, such as, for example, the methods described in U.S. Patent 2,378,629. Generally, such copolymers are prepared by reacting ethylene or isobutylene or butylene with maleic anhydride in the presence of a peroxide catalyst and an aliphatic or aromatic hydrocarbon which is a solvent for the monomers, but is a non-solvent for the copolymers formed. Suitable solvents include benzene, toluene, xylene, chlorinated benzene, hexane, acetone, ethylene dichloride, and the like. Benzoyl peroxide is a preferred catalyst, but other peroxides such as acetyl peroxide, butyryl peroxide, di-tertiary-butyl peroxide, lauryl peroxide and the like, which are soluble inorganic solvents, may be used.

The copolymer contains substantially equimolar quantities of the olefin residue and maleic anhydride reside. The properties of the polymer such as molecular weight, for example, can be regulated by proper choice of catalyst and controlling one or more of the variables such as the ratio of reactants, temperature and catalyst concentration. Molecular weight control is also effectively achieved by including in the polymerization mixture regulators such as phosphites, hydrocarbon carboxylic acids free from aliphatic unsaturation and having at least one hydrogen atom attached to an alpha-carbon atom, a mixture of (a) benzene, a halobenzene, or a haloparaffin with (b) an alkylated aromatic hydrocarbon having at least one alpha-carbon atom, aldehydes free from non-hydrocarbon substituents, mercaptans, and the like. The copolymer product is obtained in a solid form and is easily recovered by filtration, centrifugation or the like. Removal of any residual or adherent solvent can be effected by evaporation using moderate heating. The copolymers particularly useful in this invention are not limited to the anhydride form, but include the various derivatives of olefin-maleic anhydride copolymers such as the acid, partial acids, salts, partial salts, the partial esters, the imides, the partial imides, the amides, the partial amides, and the like.

The copolymers of this invention may be prepared by common techniques well known in the art. For example, the copolymers formed by the above procedure are in the anhydride form, but are readily hydrolyzed by heating with water to yield the acid form of the copolymer having the structure

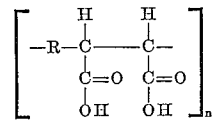

wherein R is the olefinic residue, that is, the ethylenic or isobutylenic residue, and $n$ is the number of repeating units in the polymer.

The alkali metal, alkaline earth metal, ammonium or quaternary ammonium salts can be readily obtained by reacting the copolymer in its anhydride or acid form with the stoichiometric amount of the corresponding hydroxide. Alkali metal salts of the copolymers, such as sodium, potassium and lithium salts, alkaline earth metal salts, such as barium and calcium salts, the ammonium salt and the benzyl trimethyl salt which can be prepared in this manner are useful in this invention. Partial salts may, of course, be produced by using less than the quantity of alkali required to effect complete conversion of the carboxyl groups. Similarly, other salts of the copolymers such as the di- or partial salts of amines such as methylamine, triethylamine, diethanolamine, pyridine, piperidine, and morpholine salts, are effective clay beneficiating agents, although not as effective as the alkali metal salts.

Alkali salts of the cross-linked ethylene-maleic anhydride copolymers having a specific viscosity of not less than 0.1 are particularly effective.

Also useful, but not as preferred as the salts and partial salts of the alkali metal, is the half-amide, half-ammonium salt form having the structure

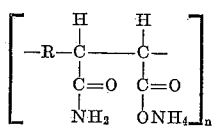

wherein R is the olefinic residue and $n$ is the number of repeating units in the polymer. These products can be made by contacting particles of finely divided copolymer with ammonia gas at room temperature or at elevated temperature. The reaction is exothermic, and it is desirable to suspend copolymer particles in an inert organic liquid such as benzene and to bubble ammonia through the suspension.

The half-amide, half-ammonium salt can be converted to the imide derivative by heating at a temperature from about 60 degrees to about 150 degrees centigrade.

It will be appreciated that the acid form of the copolymer can be used and will react in situ with alkali metal ions in the clay or in the drilling mud to convert the same to the alkali metal salts of the copolymer. However, it is usually preferred to add alkali metal salts per se to obtain more uniform results.

Although any method which results in a uniform intimate blend of polymer, salt and clay may be used in producing the clay product, a preferred method of making it is to begin by thoroughly drying a sodium bentonite such as Wyoming bentonite. A rotary gas-fired kiln is excellent for this purpose although any type of dryer useable with fine solid materials may be used. The clay is then fed to a roller mill, or other mill of the type suitable for grinding the same, and the copolymer, preferably in about 5 percent water solution, is intimately mixed with the clay, preferably by spraying the material as a fine spray onto the clay as it is fed into the mill. The quantity of copolymer is controlled to give from 0.025 to 0.25 percent in the mixture, that is, from about ½ to 5 pounds per ton of clay.

The salt is introduced into the mill and ground together with the clay. The quantity of salt introduced is controlled in the range from about 1 to 30 pounds per ton of clay, or preferably in the range from 5 to 20 pounds per ton. When the salt is to be used in the form of a mixture of salts resulting from treating bentonite with sulfuric acid, it is preferred to merely grind the clay and polymer together and to add the sulfuric acid to the bentonite slurry when it is made up. In this case, the sulfuric acid reacts with the bentonite clay and is slowly neutralized. Although very high increases in yield are obtained by the use of sulfuric acid in this manner, the slurries are corrosive; and corrosion problems set up will often be sufficiently severe to off-set the benefits derived from beneficiation of the clay.

The following examples are illustrative of the beneficiation obtained. The material designated by the trade name "DX-840-31" in these examples is an ethylene-maleic anhydride copolymer having a specific viscosity above 0.1, the material designated by the trade name "DX-849-54" is a sodium salt of an ethylene-maleic anhydride copolymer having a specific viscosity above 0.1 and the material designated as "Acrysol A-3" is a water soluble polyacrylic acid having an average molecular weight of about 75,000.

*Example I*

Wyoming bentonite was thoroughly dried in a kiln and fed into a roller mill. A five percent solution of "Acrysol A-3" was made up by diluting a commercial 25 percent solution of the polymer with water and spraying it in a fine spray upon the dry clay entering the mill. The feed rates of clay and polymer were controlled to give 1½ pounds of polymer per ton of clay. Various organic salts were ground with the clay in quantities to give from 10 to 20 pounds of salt per ton of clay. Aqueous slurries containing 3½ percent solids were made up from the resulting mixture. These slurries were allowed to stand for 24 hours and the viscosities and yields of the clay were determined. The following results were obtained:

| Salt | Viscosity | Yield |
| --- | --- | --- |
| None | 21 | 194 |
| 10-lb./ton calcium formate | 24.5 | 212 |
| 20-lb./ton calcium formate | 26.5 | 224 |
| 10-lb./ton sodium formate | 23.5 | 208 |
| 20-lb./ton sodium formate | 24.5 | 212 |
| 10-lb./ton calcium acetate | 21 | 194 |
| 20-lb./ton calcium acetate | 24 | 211 |
| 20-lb./ton sodium thiocyanate | 22.5 | 203 |

These results show that calcium formate, sodium formate, calcium acetate and sodium thiocyanate, when used in conjunction with the copolymer, are effective to further increase the yield of Wyoming bentonite beyond the yield obtained by merely treating the clay with acrylic acid polymer.

*Example II*

Wyoming bentonite was dried, passed to a mill and ground as described in Example I. A five percent aqueous solution of an ethylene-maleic anhydride copolymer, sold under the trade name "DX-840-31," was sprayed onto the clay entering the mill. Sodium sulfate and magnesium sulfate, in the quantities indicated in the following table, were added to separate batches of clay in the mill. Aqueous slurries were made up from each batch in duplicate by suspending 3½ percent of solids in water and allowing the suspension to stand for 24 hours. Viscosity and yield of the clay were determined on each sample. The following results were obtained:

| Salt | Viscosity | Yield |
| --- | --- | --- |
| None |  | 143 |
| 20-lb./ton Na₂SO₄ | 15 | 160 |
| 20-lb./ton Na₂SO₄ | 17.5 | 173 |
| 20-lb./ton MgSO₄ | 20.5 | 191 |
| 20-lb./ton MgSO₄ | 20.5 | 191 |

It will be seen that both sodium sulfate and magnesium sulfate were highly effective in increasing the yield of Wyoming bentonite over that of the same bentonite treated with ethylene-maleic anhydride copolymer alone. Of the two, magnesium sulfate gave better results, consistently increasing the yield of this particular clay by 48 barrels per ton.

*Example III*

Wyoming bentonite was dried and ground as described in Example I. A sodium salt of a cross-linked ethylene-maleic anhydride copolymer, sold under the trade name of "DX-849-54," was sprayed onto the dry bentonite entering the mill at a rate to furnish one pound of the sodium salt per ton of clay. Sodium, potassium, lithium, calcium, magnesium and barium sulfates and sulfuric acid were ground with the bentonite in quantities given in the table below. All of these materials were found to be effective for increasing the yield of the bentonite, although the increase in yield resulting from the use of barium sulfate was so small as to be substantially immaterial. The addition of sulfuric acid to the bentonite made the material quite acid at first, but the pH gradually crept up due to formation of salts in situ and neutralization of the sulfuric acid by bentonite.

Samples of different batches prepared in this manner were made up into slurries containing about 4 percent solids. These slurries were allowed to stand for 24 hours and the viscosities and yields of the clay were determined. The following results were obtained:

| Mineral salt | Viscosities | Yields |
|---|---|---|
| None | 9.5 | 110 |
| 10-lb./ton Li₂SO₄ | 15 | 141 |
| 20-lb./ton Li₂SO₄ | 15.5 | 145 |
| 10-lb./ton MgSO₄ | 15.5 | 145 |
| 20-lb./ton MgSO₄ | 14.5 | 138 |
| 10-lb./ton CaSO₄ | 13.5 | 133 |
| 20-lb./ton CaSO₄ | 14.5 | 138 |
| 10-lb./ton Na₂SO₄ | 11.5 | 120 |
| 20-lb./ton Na₂SO₄ | 15 | 141 |
| 10-lb./ton K₂SO₄ | 12 | 125 |
| 20-lb./ton K₂SO₄ | 13.5 | 133 |
| 10-lb./ton BaSO₄ | 10 | 113 |
| 20-lb./ton BaSO₄ | 10 | 113 |
| 10-lb./ton H₂SO₄ | 23 | 180 |
| 20-lb./ton H₂SO₄ | 26.5 | 195 |

*Example IV*

Wyoming bentonite was dried and passed to a mill as described in Example I. The feed entering the mill was sprayed with a 5 percent solution of an ethylene-maleic anhydride copolymer, sold under the trade name of "DX-840-31," in quantity to furnish one pound of the copolymer per ton of the clay.

Inorganic salts were ground with various batches of the bentonite and copolymer in proportions given in the table below. Slurries containing 3½ percent solids were made up by suspending samples from each batch in water. These slurries were allowed to stand 24 hours and viscosity and yield of the clay were determined. The following results were obtained:

| Na₂SO₄ | MgSO₄ | Viscosity | Yield |
|---|---|---|---|
| 20-lb./ton | | 16.5 | 169 |
| 15-lb./ton | 5-lb./ton | 19.0 | 183 |
| 10-lb./ton | 10-lb./ton | 19.5 | 186 |
| 5-lb./ton | 15-lb./ton | 18.5 | 180 |

*Example V*

The effect of increasing quantities of sodium sulfate ground with bentonite, containing one pound per ton of ethylene-maleic anhydride copolymer, prepared as in Example I, were compared with the results obtained with an equal quantity of two other ethylene-maleic anhydride copolymers and with a sodium salt of cross-linked ethylene-maleic anhydride copolymer. Samples from batches having the composition shown in the table below were used for the preparation of slurries containing 3½ percent of solids which were allowed to stand for 24 hours before determining the viscosity and yield of the clay.

| Polymer | Na₂SO₄ | Viscosity | Yield |
|---|---|---|---|
| DX-849-54 | 0-lb./ton | 5.5 | Too low for yield estimate. |
| DX-849-54 | 10-lb./ton | 8 | 113. |
| DX-849-54 | 20-lb./ton | 12 | 142. |
| DX-840-31 | 0-lb./ton | | 143 (based on 3 and 4%). |
| DX-840-31 | 20-lb./ton | 16.5 | 169. |

*Example VI*

The effect of increasing quantities of calcium sulfate ground into bentonite treated with one pound per ton of "Acrysol A-3," according to the process given in Example I, was determined by making up slurries containing 4 percent solids from the products containing various amounts of calcium sulfate, allowing the slurries to stand for 24 hours, and then determining their viscosities and yields of the clay. The following results were obtained:

| | | |
|---|---|---|
| 0-lb./ton | 14 | 139 |
| 1-lb./ton | 16.5 | 145 |
| 2-lb./ton | 18.5 | 153 |
| 3-lb./ton | 21.5 | 160 |
| 6-lb./ton | 20.5 | 156 |
| 9-lb./ton | 21 | 159 |

It was observed that the effect of increasing quantities of calcium sulfate leveled off at about 3 pounds per ton, possibly due to solubility limitations of the sulfate.

*Example VII*

The effect of grinding magnesium sulfate into bentonite treated with varying quantities of ethylene-maleic anhydride copolymer "DX-840-31," as described in Example I, was determined by grinding various proportions of magnesium sulfate with the bentonite and making up slurries containing 3½ percent solids from each of the samples and allowing these slurries to stand for 24 hours. Viscosity and the yield of the clay was then determined. The following results were obtained:

| Polymer | MgSO₄ | Viscosity | Yield |
|---|---|---|---|
| 1-lb./ton DX-840-31 | | | 135 |
| 1-lb./ton DX-840-31 | 10-lb./ton | 21 | 194 |
| 1-lb./ton DX-840-31 | 20-lb./ton | 21 | 194 |
| 1½-lb./ton DX-840-31 | | 21 | 129 |
| 1½-lb./ton DX-840-31 | 10-lb./ton | 19.5 | 188 |
| 1½-lb./ton DX-840-31 | 20-lb./ton | 20.5 | 192 |

From the foregoing it will be seen that this invention is one well adapted to attain all of the ends and objects hereinabove set forth, together with other advantages which are obvious and which are inherent to the process and composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the application is to be interpreted as illustrative and not in a limiting sense.

The invention having been described, what is claimed is:

1. An improved dry clay mixture for well fluids which consists essentially of sodium bentonite in intimate admixture with about ½ to 5 pounds per ton of a polymerized water-soluble material selected from the group consisting of ethylene and butylene maleic anhydride copolymers having a specific viscosity of at least 0.1, isobutylene maleic anhydride copolymers having a specific viscosity of at least 0.5, polyacrylic acids having a molecular weight in the range from 25,000 to 150,000 and alkali salts thereof; and about 1 to 30 pounds per ton of a material selected from the group consisting of sodium sulfate, potassium sulfate, lithium sulfate, magnesium sulfate, calcium sulfate, sodium formate, calcium acetate, sodium thiocyanate, a mixture of salts prepared by reacting sulfuric acid in situ with sodium bentonite, and mixtures thereof.

2. The mixture of claim 1 wherein the polymerized water-soluble material is ethylene maleic anhydride copolymer.

3. The mixture of claim 1 wherein the water-soluble material is an alkali salt of isobutylene maleic anhydride copolymer.

4. The mixture of claim 1 wherein the polymerized water-soluble material is a polyacrylic acid having a molecular weight in the range from 25,000 to 150,000.

5. An improved dry clay mixture for well fluids which consists essentially of sodium bentonite in intimate admixture with from 0.5 to 5.0 pounds per ton of a polymerized water-soluble material selected from the group consisting of ethylene and butylene maleic anhydride copolymers having a specific viscosity of not less than 0.1, isobutylene maleic anhydride copolymers having a specific viscosity of not less than 0.5, polyacrylic acids having a molecular weight in the range from 25,000 to 150,000 and alkali salts thereof, and from 5.0 to 20 pounds per ton of a material selected from the group consisting of sodium sulfate, potassium sulfate, lithium sulfate, magnesium sulfate, calcium sulfate, sodium formate, calcium acetate, sodium thiocyanate, salts formed in situ by treating sodium bentonite with sulfuric acid, and mixtures thereof.

6. The mixture of claim 5 wherein the polymerized water-soluble material is an ethylene maleic anhydride copolymer having a specific viscosity of not less than 0.1.

7. The mixture of claim 5 wherein the polymerized water-soluble material is a sodium salt of a cross-linked ethylene maleic anhydride copolymer having a specific viscosity of not less than 0.1.

8. An improved dry clay mixture for well fluids which consists essentially of sodium bentonite in intimate admixture with from 0.5 to 5.0 pounds per ton of an ethylene maleic anhydride copolymer having a specific viscosity of not less than 0.1, and from 5 to 20 pounds per ton of sodium sulfate.

9. An improved dry clay mixture for well fluids which consists essentially of sodium bentonite in intimate admixture with from 0.5 to 5.0 pounds per ton of an ethylene maleic anhydride copolymer having a specific viscosity of not less than 0.1 and from 5 to 20 pounds per ton of magnesium sulfate.

10. An improved dry clay mixture for well fluids which consists essentially of sodium bentonite in intimate admixture with from 0.5 to 5.0 pounds per ton of an ethylene maleic anhydride copolymer having a specific viscosity of at least 0.1, and from 5 to 20 pounds per ton of a mixture of sodium sulfate and magnesium sulfate.

11. An improved dry clay mixture for well fluids which consists essentially of sodium bentonite in intimate admixture with from about 0.5 to 5.0 pounds per ton of an ethylene maleic anhydride copolymer having a specific viscosity of not less than 0.1 and from 1 to 30 pounds per ton of calcium sulfate.

12. An improved dry clay mixture for well fluids which consists essentially of sodium bentonite in intimate admixture with about 0.5 to 5.0 pounds per ton of an ethylene maleic anhydride copolymer having a specific viscosity of not less than 0.1 and from 5 to 20 pounds per ton of a mixture of salts formed in situ by treating the sodium bentonite with sulfuric acid.

13. An improved dry clay mixture for well fluids which consists essentially of sodium bentonite in intimate admixture with from about 0.5 to 5.0 pounds per ton of a sodium salt of a cross-linked ethylene maleic anhydride copolymer having a specific viscosity of not less than 0.1 and from 5 to 20 pounds per ton of sodium sulfate.

14. An improved dry clay mixture for well fluids which consists essentially of sodium bentonite in intimate admixture with from 0.5 to 5.0 pounds per ton of a sodium salt of a cross-linked ethylene maleic anhydride copolymer having a specific viscosity of not less than 0.1, and from 5 to 20 pounds per ton of a mixture of sodium sulfate and magnesium sulfate.

15. An improved dry clay mixture for well fluids which consists essentially of sodium bentonite in intimate admixture with a sodium salt of a cross-linked ethylene maleic anhydride copolymer having a specific viscosity of at least 1.0 and from 5 to 20 pounds per ton of calcium sulfate.

16. An improved dry clay mixture for well fluids which consists essentially of sodium bentonite in intimate admixture with a sodium salt of a cross-linked ethylene maleic anhydride copolymer having a specific viscosity of at least 0.1 and from 5 to 20 pounds per ton of a mixture of salts formed in situ by treating sodium bentonite with sulfuric acid.

17. A dry clay mixture for use in drilling fluids consisting essentially of sodium bentonite in admixture with about one-half to five pounds per ton of a polymerized water-soluble material selected from the group consisting of polyacrylic acids and alkali metal salts thereof and from about 2 to 20 pounds per ton of an alkali metal sulfate.

18. A dry clay mixture for use in drilling fluids consisting essentially of sodium bentonite in admixture with about ½ to 5 pounds per ton of a polymerized water-soluble material selected from the group consisting of polyacrylic acids and alkali metal salts thereof and from about 2 to 20 pounds per ton of a member selected from the group consisting of alkali metal sulfates and calcium sulfate.

References Cited by the Examiner
UNITED STATES PATENTS

| | | | |
|---|---|---|---|
| 1,434,133 | 10/1922 | McDougal | 252—309 |
| 1,528,908 | 3/1925 | Bleininger | 252—309 |
| 1,795,011 | 3/1931 | Cross | 252—309 |
| 1,867,063 | 7/1932 | Dawe | 252—309 |
| 2,702,788 | 2/1955 | Dawson | 252—8.5 |
| 2,948,678 | 8/1960 | Turner et al. | 252—8.5 |

OTHER REFERENCES

Clays and Clay Technology, Bulletin 169, Division of Mines, Ferry Building, San Francisco 11, Calif., published July 1955, page 274.

JULIUS GREENWALD, *Primary Examiner.*

JOSEPH R. LIBERMAN, *Examiner.*